Feb. 12, 1929.

J. D. WEBER 1,702,142

PLOW

Filed Jan. 7, 1928

INVENTOR.

J. D. Weber,

BY Geo. P. Kimmel

ATTORNEY.

Patented Feb. 12, 1929.

1,702,142

UNITED STATES PATENT OFFICE.

JOSEPH D. WEBER, OF MYKAWA, TEXAS.

PLOW.

Application filed January 7, 1928. Serial No. 245,163.

This invention relates to plows and has for its object to provide, in a manner as hereinafter set forth, a ground working device of such class having adjustably supporting right, left and center plow blades, and with the center blade disposed rearwardly of the right and left blades, and whereby when traction is applied to the plow the blades will act simultaneously as busters or breakers to the right, to the left and at the center whereby the forward blades will break up the soil and the middle blade plow up the soil in fine lumps under such conditions providing for expeditiously working the ground in the manner desired.

Further objects of the invention are to provide, in a manner as hereinafter set forth, a ground working device in the form of a plow which is comparatively simple in its construction and arrangement, strong, durable, compact, adjustable, thoroughly efficient in its use, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
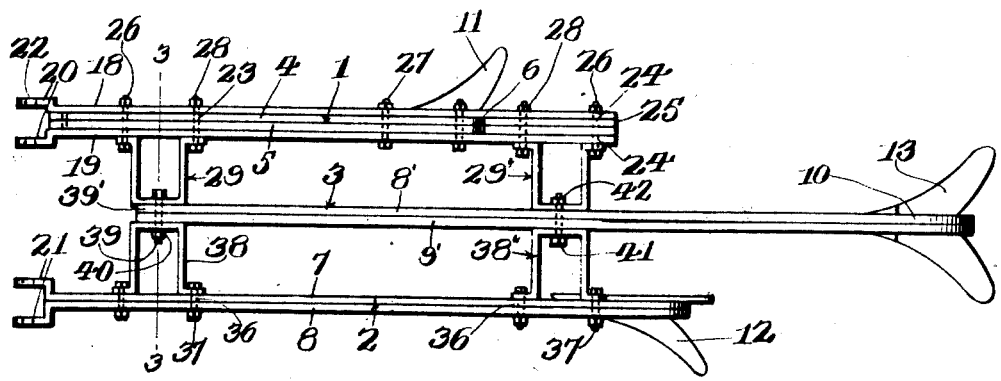
Figure 1 is a top plan view of a ground working device, such as a plow, in accordance with this invention.

Referring to the drawings, right, left and middle plow beams are indicated generally at 1, 2 and 3 respectively. The beam 1 is of less length than the beam 2 and the latter is of less length than the beam 3. The beam 1 is formed of two like sections 4, 5 having downturned rear ends 6 to provide a standard. The beam 2 is formed of two like sections 7, 8 having downturned rear ends to provide a standard 9. The beam 3 is formed of two like sections 8', 9' having a downturned rear end 10 to provide a standard. Connected with the standards 6, 9 and 10 are blades, busters or breakers 11, 12 and 13. The blade 11 operates to the right, the blade 12 operates to the left and the blade 13 operates in the middle between the blades 11 and 12 and further operates to the right and left.

Figure 2:
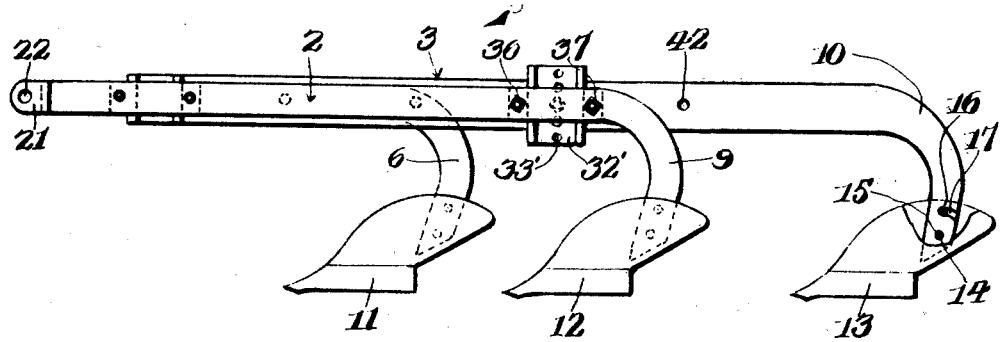
Figure 2 is a side elevation thereof.
Figure 3:
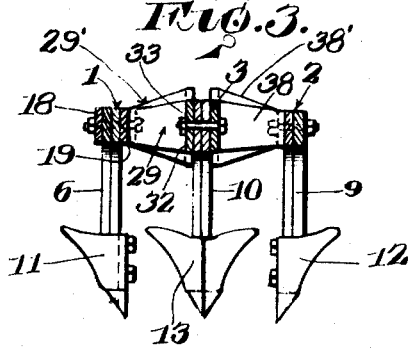
Figure 3 is a cross sectional view thereof.
Figure 4:
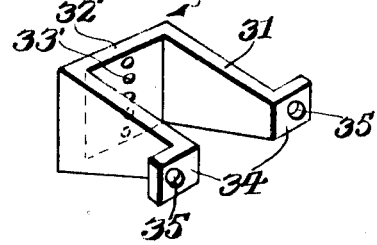
Figure 4 is a perspective view of one of the combined coupling and spacing yokes.

Each blade is connected to its respective standard by a bolt 14 extending through an opening 15 and is further coupled by a bolt 16 operating through a slot 17 formed in the blade and standard. See Figure 2. This manner of setting up a blade relative to its respective standard permits of the blade to shift when striking an inmovable object in the ground or in other words allows the blade to unhitch itself, instead of plowing through a substance which should not be plowed, such as a pipe.

The beam 1 is adjustably positioned between a pair of supporting bars 18, 19 of less length than the beam 2. The bars 18, 19 are provided at their forward ends with offset extensions 20. The sections 7, 8 of the beam 2 at their forward ends are provided with offset extensions 21. The extensions 20 and 21 are apertured as at 22 and provide means for connecting the plow to a traction means therefor.

The beam 1 is of less length than the bars 18, 19 and the sections of the beam 1 are formed with registering openings 23 adapted to register with openings 24 provided in the bars 18, 19. The openings 23 in the beam 1 selectively register with the openings 24 in the bars 18, 19. The normal position of the beam 1 is as illustrated in Figure 1, whereby the blade 11 is positioned forwardly with respect to the blade 12. The space between the bars 18, 19 when the beam 1 is in its normal position as shown in Figure 1, has arranged therein filler plates 25 connected to the bars 18, 19 by spaced holdfast devices 26. When the beam 1 is adjusted rearwardly, with respect to the bars 18, 19, the filler plates 25 are removed and the holdfast devices 26 employed to connect the beam 1 to the bars 18, 19. When the beam 1 is in the normal position, as shown in Figure 1, holdfast devices 27 and 28 are employed for securing the beam to the bars 18, 19.

The holdfast devices 26 and 28 are also employed for securing against the outer side of the bar 19 a front and rear inwardly extending combined coupling and spacing yoke 29, 29' respectively. Each of said yokes includes a pair of tapered arms or legs 30, 31, a head and a pair of oppositely extending flanges 34 at the free ends of the legs 30, 31. The head of the yoke 29 is indicated at 32 and provided with an opening 33. The head of the yoke 29' is indicated at 32' and provided with a series of superposed openings 33'. The flanges are disposed outwardly at right angles with respect to the legs 30, and 31 and each of which is formed with an opening 35. The openings 35 provide for the passage of the holdfast devices 26 and 28.

The sections 7, 8 of the beam 2 are provided with registering openings 36 for the passage of holdfast devices 37 securing to said beam front and rear inwardly extending combined coupling and spacing yokes 38, 38'. The yoke 38 is arranged in alignment with the yoke 29 and is constructed similar to the latter. The yoke 38' is positioned in alignment with the yoke 29' and is of like construction.

The heads 32 of the yokes 29, 38 abut opposite sides of the beam 3, and common to said heads for the purpose of detachably securing said yokes to such beam is a holdfast means consisting of a headed bolt 39 and a nut 40. The bolt extends through registering openings 39' formed in the sections 8', 9' of the beam 3 and through the openings 33 in the heads 32.

The heads 32' of the yokes 29', 38' abut opposite sides of the beam 3, and common to said heads is a holdfast means which coacts with the openings 33' to provide for adjustably connecting said yokes to the beam 3, whereby the rear portion of the latter can be adjusted relative to the rear portion of the beams 1, 2. The holdfast means consists of a headed bolt 41 and a nut 41'. The bolt 41 extends through selective registering openings 33' and through registering openings 42 formed in the sections 8', 9' of the beam 3.

The flanges of the yokes 29, 29' abut the bar 19 and the flange of the yokes 38, 38' abut the section 7 of the beam 2. The holdfast devices 26 and 28 extend through the flanges of the yokes 29, 29', and the holdfast devices 37 extend through the flanges of the yokes 38, 38'. The width of the flanges corresponds to the width of the beams.

The beam 1 is independently adjustable with respect to the bars 18, 19. The beam 3 is independently adjustable with respect to the beams 1 and 2. As the beam 3 is adjustable, the blade 13 can be positioned at varying elevations with respect to the blade 12. The blade 11 can be adjusted to oppose the blade 12.

It is thought the many advantages of a ground working device, in accordance with this invention, can be readily understood, and although the preferred embodiment of the invention is as illustrated and described, yet it is to be understood that changes in the details of construction can be had which fall within the scope of the invention as claimed.

What I claim is:

1. A plow comprising right, left and middle beams arranged in spaced relation and each formed with a standard, a blade operating to the right and carried by the right standard, a blade operating to the left and carried by the left standard, a blade operating to the right and left and carried by the middle standard, means for connecting said standards together, and said right beam having means to enable the vertical adjustment thereof relative to the other beams.

2. A plow comprising right, left and middle beams arranged in spaced relation and each formed with a standard, a blade operating to the right and carried by the right standard, a blade operating to the left and carried by the left standard, a blade operating to the right and left and carried by the middle standard, means for connecting said standards together, and said right and middle beams having means to enable the vertical adjustment thereof relatively to each other and relative to the left beam.

3. A plow comprising a pair of bars, a right beam arranged therebetween and provided at its rear with a blade carrying standard, a left beam provided at its rear with a blade carrying standard, a middle beam provided at its rear with a blade carrying standard, and means for connecting said beams and bars together in parallel spaced relation, said right and middle beams provided with means to enable the adjustment thereof relative to said bars and left beam.

4. A plow comprising a pair of bars, a right beam arranged therebetween and provided at its rear with a blade carrying standard, a left beam provided at its rear with a blade carrying standard, a middle beam provided at its rear with a blade carrying standard, and means for connecting said beams and bars together in parallel spaced relation, said right beam of less length than said left beam and said middle beam of greater length than said left beam, said right and middle beams provided with means to enable the adjustment thereof relative to said bars and left beam.

5. A plow comprising a pair of bars, a right beam arranged therebetween and provided at its rear with a blade carrying standard, a left beam provided at its rear with a blade carrying standard, a middle beam provided at its rear with a blade carrying standard, means for connecting said beams and bars together in parallel spaced relation, and said bars and left beam having offset parallel, apertured extensions at the forward ends thereof to couple a traction means therewith.

6. A plow comprising a pair of bars, a right beam arranged therebetween and provided at its rear with a blade carrying standard, a left beam provided at its rear with a blade carrying standard, a middle beam provided at its rear with a blade carrying standard, means for connecting said beams and bars together in parallel spaced relation, said right beam of less length than said left beam and said middle beam of greater length than said left beam, and said bars and left beam having offset parallel, apertured extensions at the forward ends thereof to couple a traction means therewith.

7. A plow comprising a pair of bars, a right beam arranged therebetween and provided at its rear with a blade carrying standard, a left beam provided at its rear with a blade carrying standard, a middle beam provided at its rear with a blade carrying standard, means for connecting said beams and bars together in parallel spaced relation, said right and middle beams provided with means to enable the adjustment thereof relative to said bars and left beam, and said bars and left beam having offset parallel, apertured extensions at the forward ends thereof to couple a traction means therewith.

8. A plow comprising a pair of bars, a right beam arranged therebetween and provided at its rear with a blade carrying standard, a left beam provided at its rear with a blade carrying standard, a middle beam provided at its rear with a blade carrying standard, means for connecting said beams and bars together in parallel spaced relation, said right beam of less length than said left beam and said middle beam of greater length than said left beam, said right and middle beams provided with means to enable the adjustment thereof relative to said bars and left beam, and said bars and left beam having offset parallel, apertured extensions at the forward ends thereof to couple a traction means therewith.

In testimony whereof, I affix my signature hereto.

JOSEPH D. WEBER.